Sept. 19, 1939.    E. H. LAND ET AL    2,173,304
LIGHT POLARIZER
Filed May 4, 1939
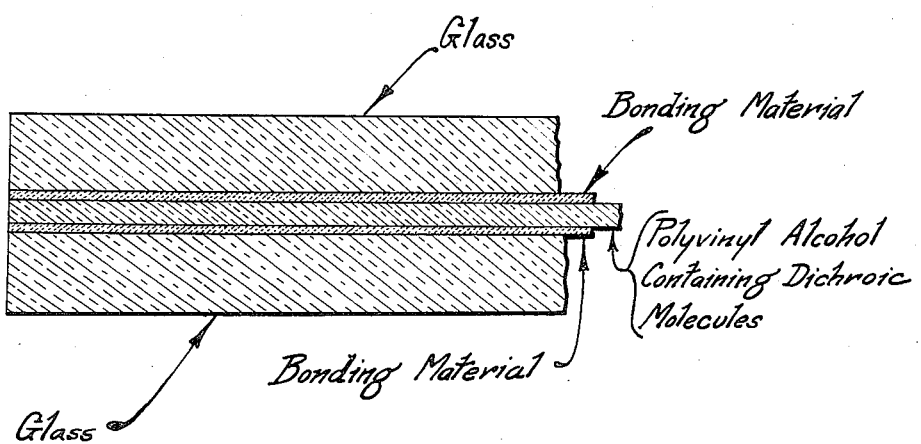
INVENTOR.
Edwin H. Land
and
BY  Howard G. Rogers
Brown & Jones
ATTORNEY.

Patented Sept. 19, 1939

2,173,304

UNITED STATES PATENT OFFICE 2,173,304

LIGHT POLARIZER

Edwin H. Land, Boston, and Howard G. Rogers, West Newton, Mass., assignors to Polaroid Corporation, Dover, Del., a corporation of Delaware Application May 4, 1939, Serial No. 271,814

14 Claims. (Cl. 88—65)

This invention relates to a light-polarizing material.

An object of the invention is to provide a sheet or film of light-polarizing material consisting of a transparent plastic, having long molecules, and more specifically polyvinyl alcohol, with its molecules oriented to substantial parallelism, and which has been heat-treated to become differentially absorbing to components of an incident beam of light vibrating in different directions.

A still further object of the invention is to provide a light-polarizing sheet or film which may be readily and efficiently laminated to glass or other supporting elements, which is substantially unaffected by most organic solvents, by ultraviolet radiation, by temperature changes within ordinary limits, and which may be protected from the action of water.

Other objects of the invention will in part be obvious and will in part appear hereinafter.

The invention accordingly comprises the article possessing the features, properties, and the relation of elements which are exemplified in the following detailed disclosure, and the scope of the application of which will be indicated in the claims.

For a further understanding of the invention, reference should be had to the accompanying drawing, which represents diagrammatically a view in section of a device embodying one form of the invention.

There has been a pressing need for a cheap, efficient light-polarizer which may be easily laminated to or between sheets of glass or sheets of plastic material and protected from moisture, which shows, when laminated, as between glass sheets, no deterioration upon extended exposure to ultraviolet radiation, which is substantially neutral in color to light vibrating in a predetermined direction, which has a high transmission for said vibrations, which is highly efficient as a polarizer in the visible spectrum, which is substantially unaffected by the organic solvents and plasticizers normally employed in connection with the formation of laminations of shatterproof glass and the like, and which is stable and substantially unaffected by temperature changes within the range usually met with in commercial applications of light-polarizing material.

Those of the commercial light polarizers now available which possess many of the desirable properties just mentioned are deficient in one or more of the others of those properties.

This invention contemplates the provision of a cheap polarizer possessing all of the desirable properties listed above.

As an example of the practice of the present invention, a dry cast sheet or extruded sheet or film of polyvinyl alcohol may be heated and stretched at a temperature such that the molecules of the material become idiodichroic, i. e., they acquire, during the heating and stretching process and without the addition of other media, such as dyes, stains or the like, the property of differential absorption of the components of an incident beam of light.

Many forms of polyvinyl alcohol, and including all examined, have been successfully employed in the practice of the present invention. For example, polyvinyl alcohol obtained from the R. & H. Chemicals Department of the E. I. du Pont de Nemours & Company, Inc., at Niagara Falls, New York, and designated "A Series", and including one so-called low viscosity, three medium viscosity, and two high viscosity forms, and material obtained from the same source and designated "B Series," low, medium and high viscosity, has been employed, as has polyvinyl alcohol obtained from the Arlington Division of the du Pont Company. With all of these materials light-polarizing sheets are obtained by preparing sheets or films of polyvinyl alcohol and heating these sheets to temperatures approximating 175° C. for from three to five minutes, during which time the sheets are stretched or extended. The sheet may preferably be stretched several times its original length, for example from two to eight times its original length.

The material obtained from the Arlington Division of du Pont gives the best results, if treated in the manner described. The stretched and heated sheet shows, upon cooling, a dark red color in the extinction position when viewed through an analyzer, and a substantially neutral or colorless transmission when the analyzer is rotated through 90°. The materials obtained from the R. & H. Chemicals Department show, on the other hand, yellow color in the extinction position when treated in the manner described.

It is desirable, especially in connection with the materials obtained from the R. & H. Chemicals Department, to employ a material which acts in the nature of a catalyst to cause the production of a darker and more desirable polarizing extinction color. Such a material will be called an accelerator. With the "A Series," for example, the sheet of polyvinyl alcohol may be treated with a solution of 1% acid, for example hydrochloric acid or hydrobromic acid, or hydriodic acid, or sulphuric acid in methanol. When the material is so treated before being heated and stretched, the extinction color of the polarizer obtained is a deep blue. The efficiency of the polarizer is greatly increased, both as to extinction and also as to transmission, and the color appears at a somewhat lower temperature; for example at a temperature of about 150° C. It is preferred to stretch the sheet at this temperature, although this is not important, as the color appears and the sheet may be stretched at the higher temperatures previously mentioned.

With the materials obtained from the R. & H. Chemicals Department and designated "B Series," a similar acid accelerator may be employed. Here, however, the preferred solution is 1% acid in 60% methanol and 40% water.

With the use of the accelerators in connection with the R. & H. Chemicals Department polyvinyl alcohol, the polarizers obtained show substantially no color in the transmission position and excellent extinction with good color, high efficiency and uniformity in the extinction position.

The accelerators may, if desired, be employed after the sheet has been stretched and the yellow color in the extinction position obtained. Under these circumstances the sheet should be re-heated after the accelerator has been applied and held under tension during the reheating.

Under certain circumstances it may be desirable to heat and stretch the polyvinyl alcohol sheet in a hot atmosphere containing a high percentage of water vapor or superheated steam. The material obtained from the Arlington Division, for example, gives an excellent polarizer showing a deep blue color in the extinction position, when heated to approximately 175° C. and stretched at that temperature in an atmosphere containing superheated steam. If desired, accelerators such as those described may be employed with this form of material. If used they result in the development of the polarizing stain at lower temperatures. Unless care is taken the stain may appear too quickly and may not be uniform.

It is frequently desirable to subject the polarizing sheets obtained as heretofore described to a further heating process. Such a process increases the impermeability to water of the product and increases its stability to changes in temperature. It has been found that further heat treatment, even at temperatures lower than those at which the sheet was formed, may result in a darkening of the sheet, not only in the extinction position but also in the transmission position, and thus to an impairment in its efficiency. This may be avoided if the sheet is first treated with an inhibitor. It has been found, for example, that if the sheet is soaked in a 5% solution of sodium chloride in equal parts of alcohol and water while maintaining it in stretched condition, it may be subjected to the reheating treatment without discoloration. The solution acts to inhibit change in the polarizing properties of the sheet.

So also, if the sheet is laminated between two glass sheets, as for example with a bond comprising plasticized polymerized incomplete polyvinyl acetal resin, further discoloration of the sheet is avoided. It will be apparent that other bonding materials, such as vinyl acetate, methyl methacrylate and the like, usually plasticized, may be used in obtaining the lamination, or the sheet may be laminated directly to glass without the use of other bonds or cements.

It should be pointed out that the high temperature to which the sheet is subjected in connection with the stretching thereof acts effectively to substantially carry forward the polymerization of the sheet, and to substantially decrease its permeability to water. In some commercial applications, further heat treatments, such as those just described, may prove unnecessary.

The sheet polarizer produced by the practice of this invention may be easily laminated to or between glass, may be waterproofed or otherwise protected from moisture, as for example by the heat treatments described, and is highly efficient as a polarizer throughout the visible spectrum. It shows no deterioration when subjected to long exposure to ultraviolet radiation. It has a neutral color in its preferred form to the transmitted component of incident light, and shows substantially complete absorption of the other component. It is substantially unaffected by most of the organic solvents for plastics and by the plasticizers normally employed in connection with laminating processes. When laminated it is substantially completely stable under the conditions of use in commercial applications, and particularly in connection with the elimination of automobile headlight glare.

While the invention has been described in connection with the use of polyvinyl alcohol, it should be understood that other plastic materials having elongated or chain-like molecules may be employed in the production of somewhat similar products. Cellulosic materials, such for example as regenerated cellulose, may be swelled by immersion in a suitable swelling solution until they have been rendered rubbery-elastic, as disclosed in the copending application of Edwin H. Land, Serial No. 237,783, filed October 29, 1938. Sheets of this material may then be stretched, for example, to the limit of their extension, and if they are then subjected to heat, for example at temperatures slightly below the charring temperature, a polarizing stain is developed in the material. It should be understood that such a product is not, however, as desirable as the products obtained by the use of polyvinyl alcohol.

In the practice of the present invention the stretching imparted to the heated sheet is preferably such as to substantially orient the molecules of the polyvinyl alcohol sheet. The final color of the polarizing sheet, especially in the extinction position, may, however, be controlled, in part at least, by controlling the degree of stretch. A sheet stretched, for example, to two and one-half times its original length, shows a noticeably different extinction color from a sheet stretched to five times its initial length. So also the temperature at which the sheet is stretched may be varied with a change in the extinction color of the sheet. All such modifications of the process are deemed to fall within the scope of the invention.

Furthermore, it is to be understood that a plasticizer may be added to the sheet to render it more flexible in its finished state. It is preferred that the plasticizer be added to the sheet in connection with its treatment by the inhibitor previously described, for it has been found that an unplasticized sheet may be more readily handled in the stretching process. Glycerine is a suitable plasticizer, as are ethylene glycol and formamid. They may be added in any desired amount, for example 10% by weight. Higher amounts tend to soften the sheet too much for most purposes.

The product of the present invention in its preferred form is substantially uniaxial with its optic axis in the plane of the sheet. It shows substantially no absorption for light vibrating perpendicular to its optic axis and high absorption for light vibrating parallel to its optic axis.

It is believed that the process of the present invention results in the dehydration of some of the long-chain molecules of the polyvinyl alcohol with the formation of hydrocarbon chain molecules having extended systems of conjugated double bonds. Preferably the dehydration should be carried forward only until the sheet of polyvinyl alcohol has lost a small percentage, for example not more than 1%, of its initial weight. Under such circumstances, the sheet shows substantially no absorption for the component of the incident light vibrating transversely to the stretched direction of the sheet. If the dehydration is carried forward until the sheet loses substantially more in weight, for example 5%, more or less, the absorption of the sheet for the transversely vibrating component becomes appreciable within the visible spectrum, and may become undesirable, while the absorption of the component vibrating parallel to the stretched direction remains, as before, substantially complete.

In the claims, the expression "idiodichroic" should be understood as meaning a plastic deriving its dichroism from inherent light-absorbing properties and not from the light-absorbing properties of added dyes or strains or from suspended crystalline material.

Since certain modifications in the article embodying the invention may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described our invention, what we claim as new and desire to secure by Letters Patent is:

1. A transparent sheet which polarizes light by differential absorption of transmitted components comprising oriented, long, chain molecules of an organic plastic, some of which are dichroic, and some of which are negligibly dichroic, said dichroic molecules being the product of an alteration within the sheet of the molecular structure of negligibly dichroic molecules, and consisting essentially only of atoms of elements present in the negligibly dichroic molecules.

2. A transparent sheet which polarizes light by differential absorption of transmitted components comprising oriented, long, chain molecules of an organic plastic, some of which are dichroic and some of which are negligibly dichroic, said dichroic molecules being the product of an alteration within the sheet of the molecular structure of negligibly dichroic molecules, and consisting essentially only of atoms of elements present in the negligibly dichroic molecules, said sheet being substantially uniaxial and having its optic axis in the plane of the sheet.

3. A dichroic light-polarizer consisting of a transparent sheet containing substantially oriented, long, straight-chain molecules of an organic plastic having extended systems of conjugated double bonds, the light-polarizing properties of said polarizer deriving essentially from said molecules, and means for retaining said molecules in oriented position.

4. A dichroic light-polarizer consisting of a transparent sheet of an organic plastic containing substantially oriented, long, straight-chain molecules having extended systems of conjugated double bonds, the light-polarizing properties of said polarizer deriving essentially from said molecules.

5. A dichroic light-polarizer consisting of a transparent sheet of an organic plastic having substantially oriented, long, straight-chain molecules, some of which are dehydrated, the light-polarizing properties of said polarizer deriving essentially from said dehydrated molecules.

6. A transparent sheet which polarizes light by differential absorption of transmitted components comprising oriented, long, chain molecules of an organic plastic, some of which are dichroic and some of which are negligibly dichroic, said dichroic molecules being the product of an alteration within the sheet of the molecular structure of negligibly dichroic molecules of said plastic.

7. A light-polarizer consisting of a transparent sheet of polyvinyl alcohol containing a substantially oriented light-polarizing dichroic alteration product of polyvinyl alcohol.

8. A polarizer consisting of a tranparent sheet of polyvinyl alcohol having its molecules substantially oriented and containing oriented, long, straight-chain molecules having extended systems of conjugated double bonds.

9. A polarizer consisting of a transparent sheet of polyvinyl alcohol having its molecules substantially oriented and containing oriented molecules of a light-polarizing, heat-treated alteration product of polyvinyl alcohol.

10. A light-polarizer consisting of a transparent sheet of polyvinyl alcohol containing substantially oriented molecules of dehydrated polyvinyl alcohol and deriving its polarizing properties essentially from said dehydrated molecules.

11. A light-polarizer which polarizes by differential absorption of transmitted components comprising oriented, long, chain molecules of a transparent organic plastic, some of which are dichroic and some of which are negligibly dichroic, said dichroic molecules being the product of an alteration within the plastic of the molecular structure of negligibly dichroic molecules of said plastic.

12. A light-polarizer comprising a transparent sheet which polarizes light by differential absorption of transmitted components and which comprises oriented, long, chain molecules of an organic plastic, some of which are dichroic and some of which are negligibly dichroic, said dichroic molecules being the product of an alteration within the sheet of the molecular structure of negligibly dichroic molecules, said dichroic molecules consisting essentially only of atoms of elements present in the negligibly dichroic molecules, and a transparent supporting element bonded to said sheet.

13. A light-polarizer comprising a transparent sheet which polarizes light by differential absorption of transmitted components and which comprises oriented, long, chain molecules of an organic plastic, some of which are dichroic and some of which are negligibly dichroic, said dichroic molecules being the product of an alteration within the sheet of the molecular structure of negligibly dichroic molecules, said dichroic molecules consisting essentially only of atoms of elements present in the negligibly dichroic molecules, and a transparent supporting element bonded to each surface of said sheet.

14. A light-polarizer comprising a transparent sheet which polarizes light by differential absorption of transmitted components and which comprises oriented, long, chain molecules of an organic plastic, some of which are dichroic and some of which are negligibly dichroic, said dichroic molecules being the product of an alteration within the plastic of the molecular structure of negligibly dichroic molecules, said dichroic molecules consisting essentially only of atoms of elements present in the negligibly dichroic molecules, and a sheet of glass bonded to each surface of said sheet by an adhesive comprising plasticized, incomplete, polymerized polyvinyl acetal.

EDWIN H. LAND.
HOWARD G. ROGERS.